Dec. 29, 1953 — E. B. KENNISON — 2,663,951
VEHICLE DRIER
Filed June 21, 1952 — 2 Sheets-Sheet 1
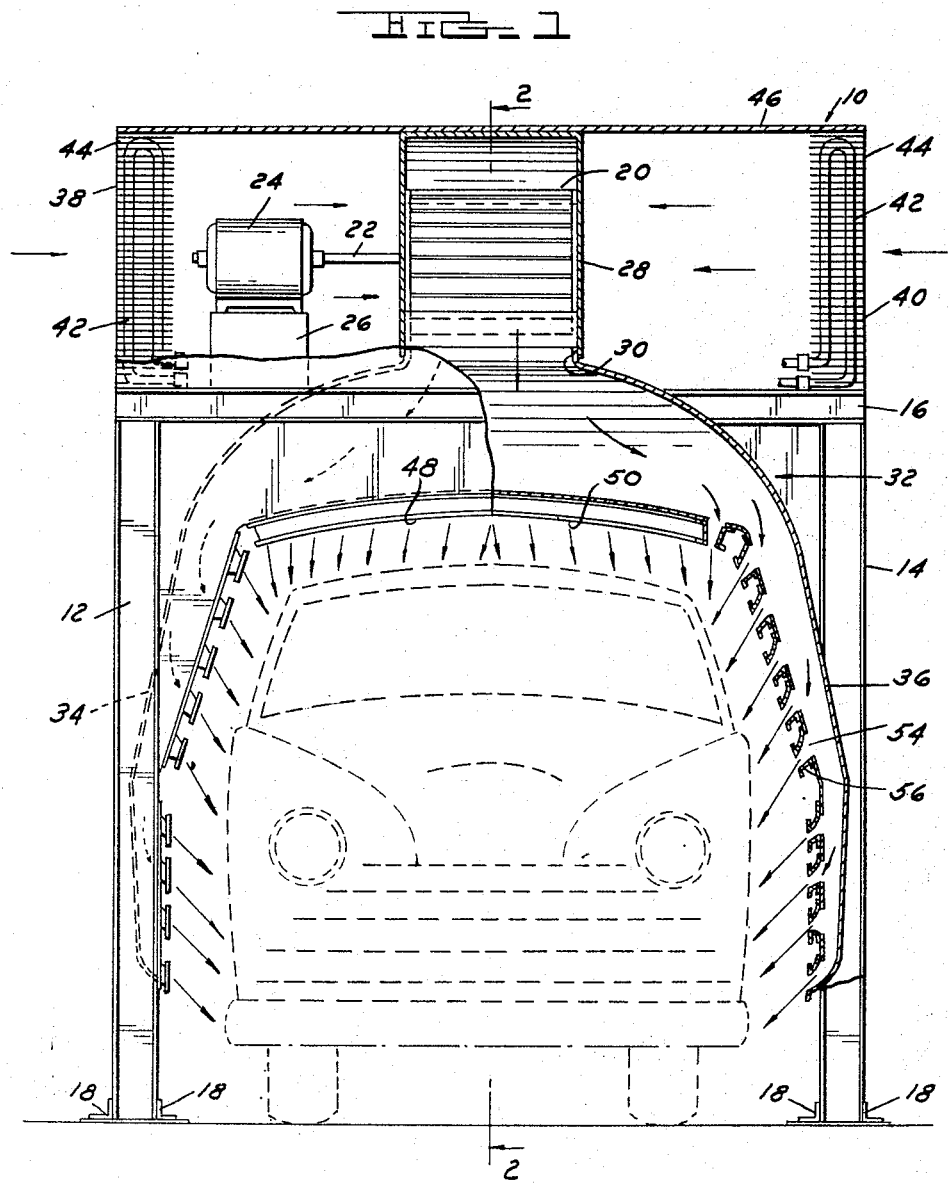
INVENTOR.
EVERETT B. KENNISON
BY
ATTORNEY

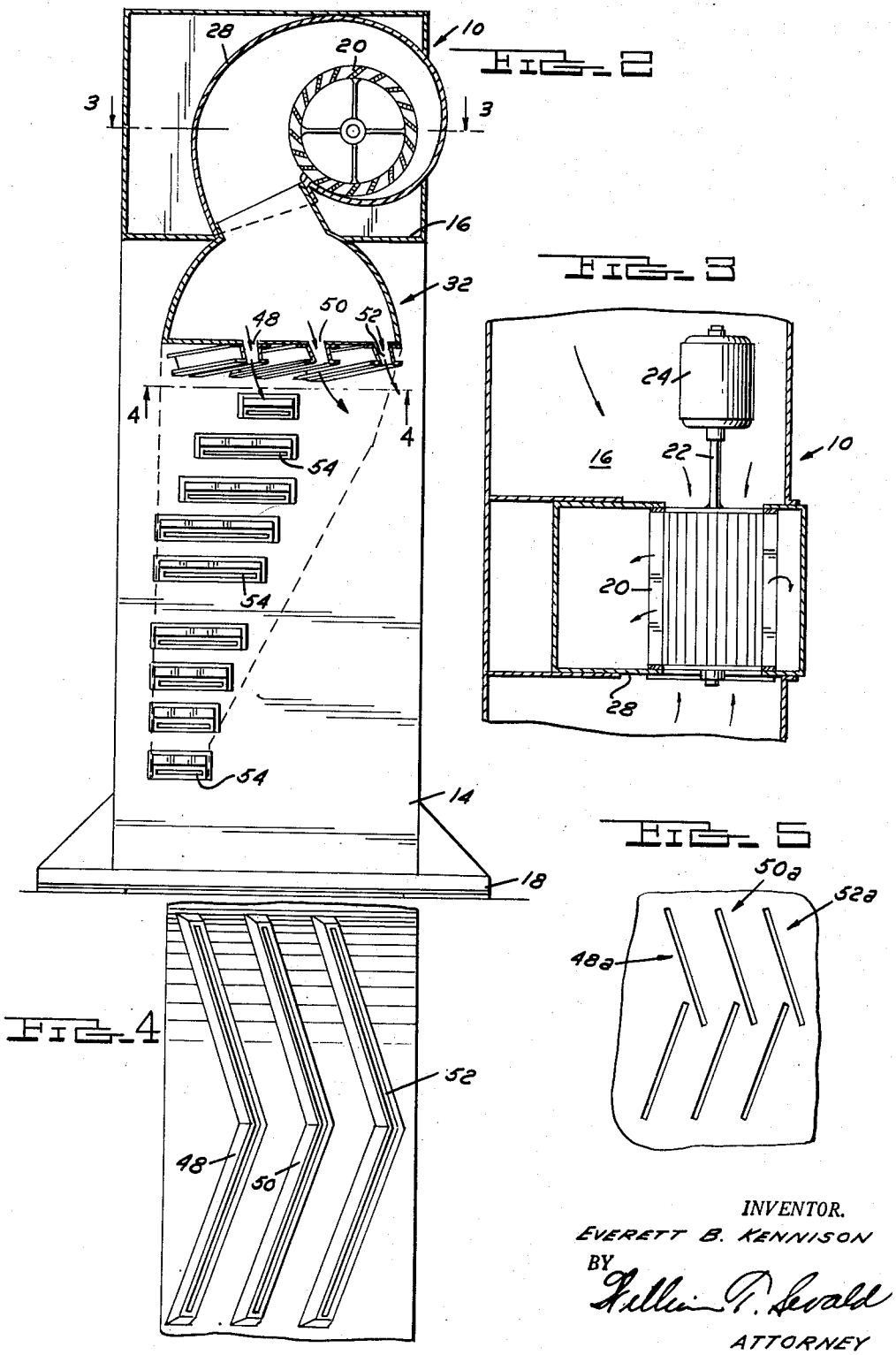

Patented Dec. 29, 1953

2,663,951

UNITED STATES PATENT OFFICE 2,663,951

VEHICLE DRIER

Everett B. Kennison, Detroit, Mich.

Application June 21, 1952, Serial No. 294,857

6 Claims. (Cl. 34—233)

The present invention relates to drying apparatus and more particularly to drying apparatus used to dry vehicles after they have been washed by automatic or semi-automatic washing apparatus.

Driers of the general type with which the present invention is concerned have posed a problem despite repeated efforts to improve the same. This problem concerns the provision of an automatic drying apparatus which will efficiently remove water from a vehicle body after washing so that the finish dry operation may be accomplished quickly and easily. In the usual quick-wash operation, from two to six men are required to accomplish the finish dry operation. It is evident that if the rough dry operation is efficient, the number of finish dry men required can be reduced and the overall operation will require less time and labor with a consequent saving in cost.

Prior constructions have suggested the use of complex arrangements of drying nozzles and flexible vehicle-engaging drying hangers but it has been found that such arrangements are cumbersome and space consuming and leave much to be desired. The nozzle and blower arrangements in such constructions spread the water on the surface of the vehicle but do not effectively remove the water from the vehicle. Thus, although a certain amount of the water is removed, concentrations of water are intermittently disposed over the vehicle surface.

Therefore, it is a principal object of the present invention to provide a drier for accommodating vehicles that have been washed, which is simple in construction and which will efficiently dry a vehicle passed therethrough, said drier being compact and economical to manufacture.

It is another object of the present invention to provide a drier for accommodating vehicles that have been washed, which is so constructed and arranged that water on a vehicle passing therethrough will be moved from the top of the vehicle along the sides thereof, the water then being carried by a direct and forceful stream of air progressively toward and off the bottom of the vehicle body.

It is a further object of the present invention to provide a drier for accommodating vehicles that have been washed, which has a plurality of air slots at the top portion thereof so arranged as to provide an effective air stream for clearing water from the top of the vehicle and forcing the water down along the sides of the vehicle.

It is another object of the present invention to provide a drier for accommodating vehicles that have been washed, which has a plurality of air vents disposed along each side of the path of the vehicle being processed therethrough, said vents being arranged one above another and directed inward toward the vehicle and downward to utilize the direct effects of the forced air stream passed through said vents while passing the water progressively downward along the sides and off the bottom of the vehicle body.

Other objects of this invention will appear in the following description and appended claims, reference being had to the accompanying drawings forming a part of this specification wherein like reference characters designate corresponding parts in the several views.

Figure 1 is a front elevation of a vehicle drier constructed according to the present invention, portions being broken away to reveal the internal construction thereof, and a vehicle being shown in phantom in drying position within the drier.

Figure 2 is a sectional view taken along the line 2—2 in the direction of the arrows, Figure 1.

Figure 3 is a fragmentary sectional view taken along the line 3—3 in the direction of the arrows, Figure 2.

Figure 4 is a fragmentary section taken along the line 4—4 in the direction of the arrows, Figure 2.

Figure 5 is a fragmentary view similar to Figure 4 showing a modified form of the vent arrangement in reduced scale.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The construction of the present invention which has solved the problem of efficient rough drying comprises generally a bridge structure disposed over and adjacent the path of a vehicle which has been washed and rinsed. The dimensions of the bridge extending in the direction of the vehicle path are relatively small so that the entire unit occupies a comparatively small amount of space. Consequently, the unit may ordinarily be added to a washing and rinsing apparatus within an enclosure without the necessity of altering the enclosure. The top of the bridge is provided with a novel arrangement of slots which are adapted to dispel forced hot air against the top of the vehicle as it passes beneath the top of the bridge. These slots efficiently push the water from the top of the vehicle to the sides thereof. As the water is moved from the top of the vehicle, it is engaged by a stream of hot air from a series of outlets arranged one above another on each side portion of the bridge and is progressively blasted down the sides and off the vehicle. The small particles of water which remain on the vehicle are heated by the hot air blasts and will evaporate to the extent that there is relatively little to do in the finish dry operation.

A preferred embodiment of the present invention is disclosed in the drawings wherein the number 10 generally indicates the bridge structure. The path of the vehicle is toward the viewer in Figure 1 of the drawings and to the left in Figure 2 of the drawings. The bridge 10 includes the supports 12 and 14 and the top platform 16 mounted thereon. The supports are held in position by any suitable means such as the angle irons 18. Since the drier will usually be located within an enclosure having a concrete floor, these angle irons can be fastened to the floor by conventional anchor bolts (not shown). A blower wheel 20 is positioned centrally above the platform 16 and is affixed to the shaft 22 which is rotatably coupled with the electric motor 24. The electric motor 24 is seated on the support 26 which in turn is affixed to the platform 16. The blower wheel 20 is enclosed in the blower housing 28 which is open at each end so that the blower wheel may draw air into both sides of the said housing. The blower housing 28 is also open at the bottom and the portion of the blower housing 28 adjacent the open bottom fits over the neck 30 of the manifold 32. The manifold 32 extends over the top of the vehicle path and has downwardly depending arms 34 and 36 on each side thereof.

Hot water radiators 38 and 40 are positioned on each side of the platform 16. These radiators are of conventional construction including cores or pipes 42 through which hot water is circulated and fins 44 disposed around the said cores or pipes. The blower wheel housing 28 and radiators are enclosed in a casing 46. Thus, as the blower wheel 20 is rotated by the electric motor 24, air is drawn in through the fins 44 past the hot water pipes 42 in each of the radiators 38 and 40 in the direction of the arrows, Figure 1. The resultant hot air is dispelled through the open bottom of the blower wheel housing 28 into the manifold 32 in the direction of the arrows, Figure 1.

The portion of the manifold 32 which is disposed above the vehicle path includes three outlets 48, 50, and 52 each of which is formed of a pair of slots joined at their central portions to form a chevron or V-shaped configuration. It will be noted in Figure 2 of the drawings that these outlets are tilted so that the apex of the chevron is slightly higher than the other portions. It has been found that this particular arrangement of the outlets will actually cause the forced hot air to push the water from the central portion of the top of the vehicle to the sides thereof in the same manner that the bow of a boat will spread the water to the sides of the hull as the boat is moved through the water. This arrangement has proven extremely efficient and is much more suitable than any arrangement of straight blower slots disposed above the vehicle top. The first outlet 52 eliminates the large concentrations of water, and the second outlet 50 and third outlet 48 remove the remaining small particles of water so that the top is nearly completely dry after the vehicle has passed beneath these outlets.

Figure 5 demonstrates another embodiment of the top air outlet arrangement wherein the slots are disposed at any angle one to the other to form forced air outlets 48a, 50a, and 52a wherein the slots overlap but do not join. This arrangement has also proven highly efficient in moving the water from the top of the vehicle.

As previously explained, the manifold 32 is provided with downwardly depending arms 34 and 36. Each of these arms is provided with the vents 54 and baffles 56 so that the forced air from the manifold 32 is blasted directly against the sides of the vehicle at a downward angle. The vents 54 in each arm 34 and 36 are arranged one above the other so that as the water is moved from the top of the vehicle it is passed progressively downward and off the bottom of the vehicle body. By directing the air stream from each vent 54 inwardly and downwardly, the water is passed down the side of the vehicle and the air stream from each vent supplements the air stream of the next highest vent. The vents 54 are disposed so that they provide a direct blast into the side of the car and face downwardly at an angle sufficient to pass the water rapidly down the sides of the car. It will be noted that the uppermost vents 54 are inclined at a greater angle (Figure 1) than the lower vents. This permits all the air streams to hit the side surfaces of the vehicle at substantially the same angle. The inward slant of the upper portions of the manifold arms 34 and 36 conforms substantially to the taper which is present in the canopy or upper section of modern automobile bodies.

Referring to Figure 2 of the drawings, it will be noted that the vents 54 are longest near the midpoint of the downwardly depending manifold arms 34 and 36, and the vents 54 near the upper and lower ends thereof are shorter. This arrangement is provided because the largest streams of air are needed around the windows of the vehicle at the point where the main body section joins the canopy of the vehicle since at these points there are various places where the water can accumulate. In addition, the upper vent 54 on each manifold arm 34 and 36 is disposed closely adjacent the ends of the outlets 48, 50, and 52 so that the outlets and vents provide a combined forced air action in removing water from the top drain through which run along most modern vehicles above the doors and along each side of the top.

From the foregoing description it will be seen that the drier of the present invention provides a unique and efficient control of forced hot air to dry a vehicle which has been washed and rinsed. The drier eliminates all the rough dry men, which may be from two to eight depending upon the size and speed of the particular system, and from two to six finish dry men, since a single man or two men at most can quickly run a cloth over the surface of the vehicle after it has been dried by the drier of the present invention to provide a thoroughly dry vehicle.

Although but a single embodiment of the invention has been shown and described in detail, it is obvious that many changes may be made in the size, shape, detail and arrangement of the

I claim:

1. A drier adapted to be disposed over and adjacent the path of a vehicle which has been washed and rinsed, comprising a bridge having a top extending above the path and a pair of upright supports disposed one on each side of the path, a forced air manifold disposed adjacent the top of said bridge and having downwardly depending arms adjacent said supports, the portion of the manifold adjacent the top of the bridge having air discharge means adapted to expel air against the top of the vehicle, a plurality of vented baffles extending from said downwardly depending arms one above another and directed inwardly and downwardly so that water from the top of the vehicle will be passed progressively downward along the sides of the vehicle and off the bottom thereof as air is expelled from said vented baffles, the upper portions of said arms slanting inwardly so that air from all the vented baffles strike the adjacent vehicle surface at substantially the same angle, and a source of forced air coupled with said air discharge means and said vented baffles, said vented baffles near the top and bottom of the said downwardly depending manifold arms having smaller openings than the vented baffles near the central portion of said downwardly depending manifold arms to provide an efficient control and distribution of the air.

2. A drier adapted to be disposed over and adjacent the path of a vehicle which has been washed and rinsed, comprising a bridge having a top extending above the path and a pair of supports disposed one on each side of the path, a forced air manifold disposed adjacent the top of said bridge and having downwardly depending arms adjacent the said supports, a plurality of vented baffles extending inwardly and downwardly from said downwardly depending arms, the portion of said manifold adjacent the top of the bridge having a pair of slots therein which diverge in the direction of travel of the vehicle and extend substantially the full width of the manifold, said diverging slots being adapted to expel forced air therethrough to efficiently move water from the top of the vehicle rearwardly and to the sides thereof where it is moved downward along the sides by the said vented baffles, and a source of forced air coupled with said slots and vented baffles, said manifold having its sides bowed downwardly from its central portion enabling said slots to follow the contour of a vehicle and remove water from areas where it tends to accumulate.

3. A drier adapted to be disposed over and adjacent the path of a vehicle which has been washed and rinsed, comprising a bridge having a top extending above the path and a pair of supports disposed one on each side of the path, a forced air manifold disposed adjacent the top of said bridge and having downwardly depending arms adjacent the said supports, a plurality of vertically spaced air vents provided in the inner surface of said arms, said vents being of varying size, the portion of said manifold adjacent the top of the bridge having a plurality of substantially V-shaped slots therein arranged so that the apex of each V-shaped slot extends opposite to the direction of travel of the vehicle, said V-shaped slots being adapted to expel forced air therethrough to efficiently move water from the top of the vehicle to the sides thereof where it is subjected to a stream of forced air from said vents, and a source of forced air coupled with said manifold.

4. A drier adapted to be disposed over and adjacent the path of a vehicle which has been washed and rinsed, comprising a bridge having a top extending above the path and a pair of supports disposed one on each side of the path, a forced air manifold disposed adjacent the top of said bridge and having downwardly depending arms adjacent the said supports, a plurality of air vents provided in said downwardly depending arms, the portion of said manifold adjacent the top of the bridge having a plurality of air discharge outlets, each of said outlets comprising a pair of separate diverging slots which diverge in the direction of travel of the vehicle, said slots overlapping in their converging direction said diverging slots being adapted to expel forced air therethrough to efficiently move water from the top of the vehicle to the sides thereof where it is subjected to a stream of forced air from said vents, and a source of forced air coupled with said manifold.

5. A drier adapted to be disposed over and adjacent the path of a vehicle which has been washed and rinsed, comprising a bridge having a top extending above the path and a pair of supports disposed one on each side of the path, a forced air manifold disposed adjacent the top of said bridge and having downwardly depending arms adjacent the said supports, a plurality of vented baffles extending from said downwardly depending arms one above another and directed inwardly and downwardly, the portion of said manifold adjacent the top of the bridge being provided with a plurality of discharge outlets, each of said outlets comprising a pair of separate, overlapping, but non-joining diverging slots which diverge in the direction of travel of the vehicle, said diverging slots being adapted to expel forced air therethrough to efficiently move water from the top of the vehicle to the sides thereof where it is moved downward along the sides by the said vented baffles, and a source of forced air coupled with said manifold.

6. A drier according to claim 5 wherein the portion of the manifold containing the diverging slots is tilted so that the points of greatest divergence extend downward further than the other portion of said slots.

EVERETT B. KENNISON.

References Cited in the file of this patent

UNITED STATES PATENTS

| Number | Name | Date |
| --- | --- | --- |
| 1,140,873 | Carter | May 25, 1915 |
| 1,756,965 | Zademach | May 6, 1930 |
| 1,934,494 | Gillespie | Nov. 7, 1933 |
| 2,073,669 | Zademach | Mar. 16, 1937 |
| 2,440,157 | Rousseau | Apr. 20, 1948 |
| 2,448,834 | Rousseau | Sept. 7, 1948 |
| 2,596,800 | Webb | May 13, 1952 |